United States Patent
Fahrenholz

[15] 3,705,655
[45] Dec. 12, 1972

[54] DEVICE FOR THE CONTROLLED ROTATION AND FEEDING OF A WORKPIECE PARTICULARLY FOR A COLD PILGER MACHINE

[72] Inventor: Heinz Fahrenholz, Duisburg, Germany

[73] Assignee: Demag AG, Duisburg, Germany

[22] Filed: June 21, 1971

[21] Appl. No.: 154,776

[30] Foreign Application Priority Data

July 10, 1970  Germany.....................P 20 34 315.1

[52] U.S. Cl. ..............................214/338, 198/33 AC
[51] Int. Cl. ..............................................B65h 51/00
[58] Field of Search ..............214/338; 72/64; 82/2.5; 198/33 AC, 33 AD

[56] References Cited

UNITED STATES PATENTS

| | | | |
|---|---|---|---|
| 2,623,627 | 12/1952 | MacLennan | 198/33 AD |
| 2,952,944 | 9/1960 | Given | 214/338 |
| 3,280,995 | 10/1966 | Barkley | 198/33 AC |

*Primary Examiner*—Albert J. Makay
*Assistant Examiner*—John Mannix
*Attorney*—John J. McGlew et al.

[57] ABSTRACT

A device for feeding oblong workpieces, particularly for a cold pilger machine comprises first and second endless conveyors having opposed reaches extending substantially parallel and between which a workpiece is adapted to be fed by engagement with the conveyor. The conveyors are supported in a housing which is rotatably mounted in order to impart a rotation to the workpiece in addition to its transverse feeding movement. The apparatus includes an input or drive shaft connected through a first cam controlled gearing for controlling the rotation of the housing and connected through a second cam controlled gearing for controlling the advancement movement of the conveyors. The second cam controlled gearing includes a belt drive which provides for a variation of operation and a drive through planetary gearing and rotary gear members for effecting the drive of the conveyor elements.

7 Claims, 1 Drawing Figure

PATENTED DEC 12 1972 3,705,655
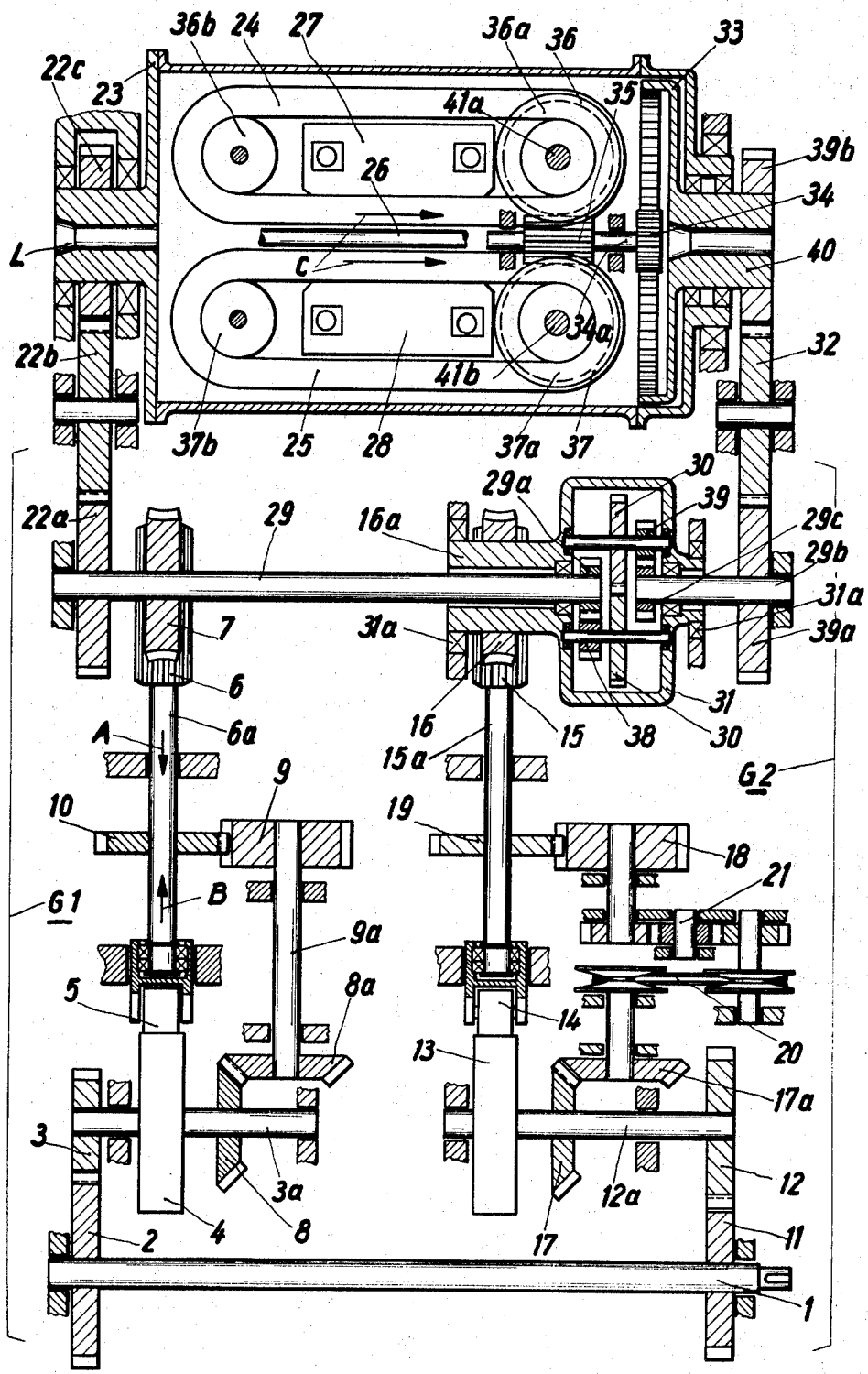
Inventor:
HEINZ FAHRENHOLZ
BY: John J. McHew
ATTORNEY

DEVICE FOR THE CONTROLLED ROTATION AND FEEDING OF A WORKPIECE PARTICULARLY FOR A COLD PILGER MACHINE

BACKGROUND OF THE INVENTION

1. Field of the Invention

This invention relates in general to the construction of metal forming machines and in particular to a new and useful rotating and feeding device, particularly for a cold pilger machine.

2. Description of the Prior Art

In the operation of cold pilger machines which have a reciprocating rolling stand it is customary to turn the workpiece or pipe at each stroke of the stand through a certain angle and to advance it by a certain amount. In the presently known devices the rotary and the feeding movements are produced by separate gearings. Either both movements take place in the inlet dead center of the rolling stand or the feed takes place in the inlet dead center and the rotation on the outlet dead center. It is also possible to produce an additional rotation in the outlet dead center. In the conventional devices the rotary movement is transmitted from a turning gear to so-called chucks, which take the pipe alone during the rotary movement or permit the sliding movement of the workpiece in the chucks during the feed. A carriage is provided for the feed which either engages the pipe at the rear and displaces it in rhythm, or which embraces the pipe from the outside with clamping jaws and moves it forwardly in this manner.

In the normal operating devices the carriage stroke is about from 5 to 7m. When the carriage stroke is completed, the device must be stopped and the carriage returned into its starting position. After a new pipe is introduced the cycle starts again. A disadvantage of this type of device is that much time is lost by the necessity for stopping and recharging, and the tolerance of the pipe workpiece in the device varies because the rolling stand stops on the pipe workpiece and the wall tolerance of the pipe is influenced by temperature changes.

Continuous devices have been built in which two carriages are provided. In operation one carriage performs the feed stroke advancing the pipe while the other carriage returns the pipe to its starting position. The device is therefore ready for operation with the other carriage after the feed stroke of the first carriage is completed. Such a device requires high construction costs which result from the use of the two carriages and the drives which are necessary to produce their opposite movements. In addition, the constant back and forth movement causes great wear on the guide elements of the carriage so that high-grade materials must be used which can only be machined at considerable cost. This also requires an additional inlet lathe chuck. For supporting the pipe before, behind and between the carriages there is required supporting means which are likewise moved backwardly and forwardly with the carriages.

SUMMARY OF THE INVENTION

In accordance with the present invention there is provided a device for rotating and feeding a workpiece which is simpler and thus cheaper than the known constructions. The invention provides a rotating and feeding device in which the workpiece is engaged between opposed reaches of two endless conveyors which are driven from pulleys which rotate about axes transverse to the longitudinal axis of the workpiece in order to advance the workpiece in an axial direction. The conveyors are mounted in a housing which can rotate about the longitudinal axis of the workpiece and drive means are connected to the housing and the conveyor to provide controlled movement of the conveyors and rotation of the housing in accordance with the necessary feeding and rotation requirements. The construction is such that the rotating and feeding movements are transmitted in a compact device to the workpiece and the workpiece does not slip in the inlet chuck during the feeding. No changes are required on the device if the length of the workpiece of a machine changes. There is no limitation on the length of the workpiece which may be machined because there are no elements which reciprocate in long straight lines.

It is advisable to use a feeding device which comprises at least two endless belts or chains which, for example, may be uniformly distributed around the circumference of the workpiece or arranged at respective opposite sides, and which are guided over guide rollers or sprockets arranged at spaced longitudinal locations. The conveyors are carried in a housing frame which is rotated as necessary to impart the rotation to the workpiece through the action of the engagement of the conveyors therewith.

A feature of the invention is the drive means for actuating the rotation of the housing and the advancing movement of the conveyor selectively. The drive means includes two separate gear take-offs from a drive shaft, each of which includes a cam operated drive. One of the drive take-offs, that is, the one for the conveyors, includes a further belt gearing which may be infinitely varied in order to provide a large range of conveyor movement operation variation. The drive of the gearing for the conveyors is advantageously through a planetary gearing and through a rotational drive which extends into one end of the housing and is connected to the conveyor wheels for rotating them. By corresponding adaptation of the movements of the two gear trains it is possible to effect the rotation and feeding movement, either jointly or separately, depending upon all operating conditions.

Accordingly, it is an object of the invention to provide an improved device for feeding workpieces, particularly for cold pilger machines which includes first and second endless conveyors which have opposed reaches between which a workpiece is adapted to be fed, and including a housing carrying the conveyors which is rotatable and with drive means for selectively rotating the housing and advancing the conveyors for selectively rotating and feeding the workpiece.

A further object of the invention is to provide a device for selectively rotating and advancing a workpiece through a feed path which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawings is a partly schematic sectional view of the device for feeding oblong workpieces in a cold pilger machine constructed in accordance with the invention.

GENERAL DESCRIPTION OF THE PREFERRED EMBODIMENT

Referring to the drawing in particular, the invention embodied therein comprises a device for feeding oblong workpieces 26, particularly in a cold pilger machine in which the workpiece is fed in an axial direction on occasion and is also rotated on occasion.

The device represented in the drawing is provided for the most complicated case occurring in practice, namely to produce in one dead center of the rolling stand at the same time a rotary and a feeding movement and in the other, merely a rotary movement.

The rotating and feeding device proper receives its working energy over two parallel first and second gear trains G1 and G2, which influence each other. The driving force is transmitted by an input or drive shaft 1 connected to the main drive of the rolling mill and to both gear trains. The driving force through gear train G1 is effected through a pair of gears 2, 3 to an intermediate shaft 3a on which is secured a cam disk 4. Cam disk 4 acts on a roller 5 carried on the lower end of a worm shaft 6a mounted for axial movement.

A bevel gear 8 is secured to shaft 3a and it meshes with a corresponding bevel gear 8a which is secured on an auxiliary shaft 9a which extends parallel to the shaft 6a. A wide spur gear 9, secured on shaft 9a, meshes with a counter gear 10 secured on the shaft 6a. The shaft 6a is constantly rotated and thus so is also a worm 6 which is secured on its end.

Worm 6 meshes with a worm wheel 7 secured on a shaft 29. The direction of rotation of worm 6 is so selected that it tries to screw itself out of worm wheel 7 in the direction A. Cam disk 4 has a uniform pitch on the major part (e.g., 7/8) of its circumference. The pitch of worm 7 is so selected that it is identical with the pitch of cam disk 4. This causes the roller 5 to bear constantly on disk 4.

When roller 5 is at the lowest point of cam disk 4 and it rises to the high point, shaft 6a and thus worm 6 is advanced in the direction of arrow B. The worm acts like a rack on worm gear 7 and turns the worm gear through a certain angle. This intermittent rotary movement, which is exerted on shaft 29, is transmitted over the gears 22a, 22b to a gear 22c affixed to a rotatably mounted frame 23. In this frame 23 is arranged the feeding device for a workpiece 26 and its drive is effected over the second gear train G2. The second gear train G2 corresponds substantially to the first gear train G1. A gear 11 secured on the input shaft 1 meshes with a gear 12 of an intermediate shaft 12a. On shaft 12a is arranged a cam disk 13 which transmits through a roller 14 an axial movement to a shaft 15a carrying at its end a worm 15. Worm shaft 15a is at the same time set in rotation by a bevel gear 17 secured on shaft 12a which meshes with a bevel gear 17a on the driving shaft of a variable transmission ratio belt drive 20. Between the driving side of belt drive 20 and the continuing shaft train is arranged an intermediate gear 21 for reversing the direction of rotation. The transmission of the rotary driving force to shaft 15a is finally effected over a wide gear 18 to a counter gear 19 secured on shaft 15a. Worm 15 which is secured on shaft 15a meshes with a worm wheel 16 which is secured on a hollow shaft 16a. The hollow shaft 16a forms a lateral extension of an epicyclic unit of an epicyclic or planetary gear mounted rotatably in bearing 31a. Gear 16 is turned during the displacement of shaft 15a, and gear 15 acts in the manner of a rack and, if sun gear 29a secured on shaft 29 stands still, shaft 29b at the delivery end of the epicyclic gear is turned. The driving force is effected from planet gear 38 rolling off on sun gear 29a to move intermediate gears 30 and an additional plant gear 39. The gear 39 drives gear 29c arranged on shaft 29b. A spur gear 39a affixed to shaft 29b meshes with an intermediate gear 32 to drive a gear 39b. Gear 39b is secured on a rotatably mounted hub 40 which supports the right end of the frame or housing 23 as shown in the drawing and the hub receives the feeding device to which a hollow gear portion 33 of hub 40 is connected. In engagement with the hollow gear 33 is a pinion 34. On shaft 34 a of the pinion 34, is secured a worm 35 which meshes with worm wheels 36 and 37. The worm wheels 36 and 37 are arranged on shafts 41a and 41b which are rotatably mounted in frame 23. The frame 23 carries guide wheels or rollers 36a and 37a for endless conveyor elements 24 and 25 which cooperate for transporting the workpiece 26. The surface pressure with which the conveyor elements 24,25 engage workpiece 26 can be regulated by means of adjustable guide or pressure pieces 27,28.

The method of operation of the rotating and feeding device is as follows:

If the rotary movement of worm gear 7 is transmitted simultaneously from shaft 29 through the gears 30 of the epicyclic gear 31 and the gears 39a, 32, 39b to the hollow gear 33, the gear 33 moves simultaneously with the housing or frame 23. Consequently there is no movement between hollow gear 33 and pinion 34 so that the workpiece 26 performs a rotary movement only jointly with frame 23.

But if worm wheel 16 also performs at the same time a rotary movement, for example, in the inlet dead center of the rolling stand, with the rotary movement of worm gear 7, the housing of the epicyclic gear 33 is turned in worm gear 16. This results in a speed difference between hollow gear 33 and the housing or frame 23. Due to this speed difference pinion 34 and thus worm 35 rotates, which in turn drives the two worm gears 36 and 37 and thus the conveyor elements 24, 25 in the direction of arrow C. In this latter case a rotating and feeding movement is thus exerted simultaneously on workpiece 26.

By a corresponding design of the cams 4 and 14 in connection with the reductions of the pairs of gears 2, 3 and 11, 12 it is possible to produce the desired rotating and feeding movements individually or jointing. The embodiment represented in the drawing shows a gear where a rotary and a feeding movement is effected in one dead center position of the rolling stand, while in the other dead center only a rotary movement takes place. The angle of rotation is here constant, while the length of the feed in infinitely variable by adjusting the belt gearing 20.

While a specific embodiment of the invention has been shown and described in detail to illustrate the application of the principles of the invention, it will be understood that the invention may be embodied otherwise without departing from such principles.

What is claimed is:

1. A device for feeding oblong workpieces particularly for cold pilger machines comprising first and second endless conveyors having opposed reaches between which a workpiece is adapted to be fed, housing means supporting said first and second endless conveyors for rotation together about the longitudinal axis of the workpiece for rotating the workpieces with said first and second conveyors, and drive means connected to said housing means and to said first and second conveyors for selectively rotating said housing and moving said first and second conveyors for varying the amount and timing of rotation and feeding movement of the workpiece.

2. A device according to claim 1, wherein said housing means includes a cylindrical housing enclosing said first and second conveyors, said first and second conveyors including a driving element rotatably supported in said housing.

3. A device according to claim 1, wherein said drive means includes a common drive shaft, first gearing means connected to said drive shaft and connected to said housing for rotating said housing, said first and second endless conveyors having a rotatable drive element, second gearing connected to said drive shaft and connected to said rotating drive element of said first and second conveyors for moving said conveyors, said first and second gearing including a planetary gearing permitting the differential rotation for driving said conveyor driving element from said housing without interfering with the rotation of said housing.

4. A device according to claim 3, wherein said second gearing includes an infinitely variable speed gear drive.

5. A device according to claim 3, wherein said first gearing includes an axially displaceable worm shaft, a cam engaged with said worm shaft and being rotatable in said gearing for displacing said worm shaft, said worm shaft having a worm gear, a worm driven by said worm gear upon movement of said worm shaft, the direction of the worm in respect to the worm gear being such that it moves away from the worm gear in opposition to the actual axial movement imparted to the worm shaft by said cam.

6. A device according to claim 1, wherein said first and second conveyors includes at least one driving rotatable member having a shaft with a worm gear thereon and a worm rotatably mounted in said housing and driven by said drive means and engageable with said worm gear to move said conveyors, said drive means including an internal gear rotatably mounted adjacent one end of said housing, and a gear driven by said internal gear connected to said worm to rotate said worm.

7. A device according to claim 1, wherein said drive means includes gearing for driving sad first and second endless conveyors and a second bearing for rotating said housing, and including planetary gear means located between said first gearing and said first and second endless conveyors.

* * * * *